United States Patent
Stamatakis et al.

(10) Patent No.: US 11,259,099 B2
(45) Date of Patent: *Feb. 22, 2022

(54) SYSTEM, METHOD AND APPARATUS FOR DISTRIBUTING MONITORING LOCATION SENSOR DATA

(71) Applicant: Senseware, Inc., Vienna, VA (US)

(72) Inventors: Julien G. Stamatakis, Centreville, VA (US); Serene Al-Momen, Centreville, VA (US)

(73) Assignee: Senseware, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,099

(22) Filed: Jul. 21, 2020

(65) Prior Publication Data

US 2021/0014581 A1 Jan. 14, 2021

Related U.S. Application Data

(63) Continuation of application No. 16/233,933, filed on Dec. 27, 2018, now abandoned, which is a
(Continued)

(51) Int. Cl.
*H04L 29/08* (2006.01)
*H04Q 9/00* (2006.01)
(Continued)

(52) U.S. Cl.
CPC .......... *H04Q 9/00* (2013.01); *B60H 1/00842* (2013.01); *F24F 11/30* (2018.01); *G01D 4/002* (2013.01); *G01D 4/006* (2013.01); *G06F 3/0482* (2013.01); *G06F 3/04842* (2013.01); *G08C 19/00* (2013.01); *H04B 1/38* (2013.01);
*H04L 41/04* (2013.01); *H04L 41/0809* (2013.01); *H04L 43/10* (2013.01); *H04L 67/10* (2013.01); *H04L 67/12* (2013.01); *H04W 4/38* (2018.02); *H04W 4/70* (2018.02); *H04W 4/80* (2018.02); *H04W 24/02* (2013.01); *H04W 84/18* (2013.01); *F24F 11/0001* (2013.01); *F24F 2110/00* (2018.01); *G01D 4/004* (2013.01); *G08B 19/00* (2013.01); *H04Q 2209/10* (2013.01); *H04Q 2209/40* (2013.01); *H04Q 2209/43* (2013.01);
(Continued)

(58) Field of Classification Search
CPC ...................................................... H04L 67/10
See application file for complete search history.

(56) References Cited

U.S. PATENT DOCUMENTS 6,437,692 B1 8/2002 Petite
7,142,107 B2 11/2006 Kates
(Continued)

OTHER PUBLICATIONS

Cloud Logger, 38 Zeros, 2015.
(Continued)

*Primary Examiner* — Adnan M Mirza

(57) ABSTRACT

Parties having different responsibilities and interests at a monitored location can be given a partial view of the totality of the sensor channels of data generated by the various sensors installed at the monitored location. The partial views deliver customized sets of data streams to customers. The selective distribution of sensor information accommodates the divergent interests and needs of parties responsible for tracking the various characteristics of a monitored location.

20 Claims, 9 Drawing Sheets

Related U.S. Application Data continuation of application No. 15/803,165, filed on Nov. 3, 2017, now Pat. No. 10,171,972, which is a continuation of application No. 14/710,247, filed on May 12, 2015, now Pat. No. 9,813,489.

(60) Provisional application No. 62/136,959, filed on Mar. 23, 2015, provisional application No. 61/992,307, filed on May 13, 2014.

(51) Int. Cl.
| | | |
|---|---|---|
| G01D 4/00 | (2006.01) | |
| H04W 84/18 | (2009.01) | |
| H04W 4/70 | (2018.01) | |
| H04W 4/80 | (2018.01) | |
| H04L 67/12 | (2022.01) | |
| G06F 3/0482 | (2013.01) | |
| G06F 3/04842 | (2022.01) | |
| G08C 19/00 | (2006.01) | |
| H04L 41/0806 | (2022.01) | |
| H04W 24/02 | (2009.01) | |
| H04L 43/10 | (2022.01) | |
| H04L 67/10 | (2022.01) | |
| H04L 41/04 | (2022.01) | |
| H04W 4/38 | (2018.01) | |
| F24F 11/30 | (2018.01) | |
| B60H 1/00 | (2006.01) | |
| H04B 1/38 | (2015.01) | |
| G08B 19/00 | (2006.01) | |
| H04W 92/06 | (2009.01) | |
| H04W 88/16 | (2009.01) | |
| F24F 110/00 | (2018.01) | |
| F24F 11/00 | (2018.01) | |

(52) U.S. Cl.
CPC ..... *H04Q 2209/60* (2013.01); *H04Q 2209/80* (2013.01); *H04W 88/16* (2013.01); *H04W 92/06* (2013.01)

(56) References Cited

U.S. PATENT DOCUMENTS

| | | | |
|---|---|---|---|
| 7,379,981 | B2 | 5/2008 | Elliott et al. |
| 8,051,489 | B1 | 11/2011 | Montenegro |
| 8,103,389 | B2 | 1/2012 | Golden et al. |
| 8,874,266 | B1 | 10/2014 | Francis |
| 9,146,113 | B1 | 9/2015 | Funk |
| 9,534,929 | B1 | 1/2017 | Stamatakis et al. |
| 9,534,930 | B1 | 1/2017 | Stamatakis |
| 9,538,578 | B1 | 1/2017 | Stamatakis et al. |
| 9,551,594 | B1 | 1/2017 | Stamatakis |
| 9,554,236 | B1 | 1/2017 | Stamatakis |
| 9,714,843 | B1 | 7/2017 | Stamatakis et al. |
| 9,714,844 | B1 | 7/2017 | Stamatakis et al. |
| 9,756,511 | B1 | 9/2017 | Stamatakis et al. |
| 9,762,979 | B1 | 9/2017 | Stamatakis et al. |
| 9,763,118 | B1 | 9/2017 | Stamatakis et al. |
| 9,800,646 | B1 | 10/2017 | Stamatakis et al. |
| 9,813,489 | B1 | 11/2017 | Stamatakis et al. |
| 9,876,653 | B1 | 1/2018 | Stamatakis |
| 9,888,336 | B1 | 2/2018 | Stamatakis |
| 9,942,693 | B2 | 4/2018 | Stamatakis |
| 9,986,411 | B1 | 5/2018 | Stamatakis |
| 10,142,196 | B1 | 11/2018 | Stamatakis et al. |
| 10,143,038 | B1 | 11/2018 | Stamatakis |
| 10,149,141 | B1 | 12/2018 | Stamatakis et al. |
| 10,171,891 | B1 | 1/2019 | Stamatakis |
| 10,171,972 | B2 | 1/2019 | Stamatakis et al. |
| 10,178,638 | B1 | 1/2019 | Stamatakis et al. |
| 10,237,631 | B2 | 3/2019 | Stamatakis et al. |
| 10,263,841 | B1 | 4/2019 | Stamatakis et al. |
| 10,313,149 | B2 | 6/2019 | Stamatakis |
| 10,313,197 | B1 | 6/2019 | Stamatakis |
| 10,334,417 | B2 | 6/2019 | Stamatakis et al. |
| 10,536,838 | B2 | 1/2020 | Stamatakis |
| 10,542,331 | B2 | 1/2020 | Stamatakis |
| 10,652,767 | B1 | 5/2020 | Stamatakis |
| 10,687,231 | B1 | 6/2020 | Stamatakis |
| 2006/0059224 | A1 | 3/2006 | Yao |
| 2007/0093974 | A1 | 4/2007 | Hoogenboom |
| 2007/0211681 | A1 | 9/2007 | Sun et al. |
| 2007/0229285 | A1 | 10/2007 | Smith |
| 2008/0195584 | A1 | 8/2008 | Nath |
| 2010/0070618 | A1 | 3/2010 | Kim |
| 2010/0082988 | A1 | 4/2010 | Huebner |
| 2011/0040809 | A1 | 2/2011 | Spanier |
| 2011/0197064 | A1 | 8/2011 | Garcia Morchon |
| 2012/0008783 | A1 | 1/2012 | Montenegro |
| 2012/0098446 | A1 | 4/2012 | Kim |
| 2012/0258903 | A1 | 10/2012 | Bjelopavlic |
| 2012/0311413 | A1 | 12/2012 | Pelletier |
| 2014/0126581 | A1 | 5/2014 | Wang |
| 2014/0337256 | A1 | 11/2014 | Varadi |
| 2014/0359133 | A1 | 12/2014 | Tian |
| 2015/0029022 | A1 | 1/2015 | Stebbins |
| 2015/0277407 | A1 | 10/2015 | Vanderkoy |
| 2015/0316945 | A1 | 11/2015 | Soya |
| 2016/0006264 | A1 | 1/2016 | Alperin |
| 2016/0066068 | A1 | 3/2016 | Schultz |
| 2016/0112518 | A1 | 4/2016 | Haleem et al. |
| 2016/0121487 | A1 | 5/2016 | Mohan |
| 2016/0241445 | A1 | 8/2016 | Kim |
| 2017/0262014 | A1 | 9/2017 | Laycock |
| 2018/0095135 | A1 | 7/2018 | Kawasaki |
| 2018/0198688 | A1 | 7/2018 | Dawes |

OTHER PUBLICATIONS

Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3_{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.

(56) References Cited

OTHER PUBLICATIONS

SmartStruxture Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
Dolphin Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
ISelect Adds New Portfolio Company: Bractlet, 2015.
Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™ Temperature & Door Smart Sensor, 2016.
First Action Interview Pilot Program Pre-Interview Communication, U.S. Appl. No. 14/862,280, dated Mar. 8, 2017.
First Action Interview Pilot Program Pre-Interview Communication, U.S. Appl. No. 14/996,442, dated Dec. 6, 2017.
Office Action, U.S. Appl. No. 15/790,123, dated Jul. 25, 2018.
Final Office Action, U.S. Appl. No. 15/790,123, dated Jan. 4, 2019.
Office Action, U.S. Appl. No. 16/378,139, dated Apr. 17, 2020.
Office Action, U.S. Appl. No. 15/790,123, dated Jul. 15, 2020.

SYSTEM, METHOD AND APPARATUS FOR DISTRIBUTING MONITORING LOCATION SENSOR DATA

This application is a continuation of non-provisional application Ser. No. 16/233,933, filed Dec. 27, 2018, which is a continuation of non-provisional application Ser. No. 15/803,165, filed Nov. 3, 2017 (now U.S. Pat. No. 10,171,972), which is a continuation of non-provisional application Ser. No. 14/710,247, filed May 12, 2015 (now U.S. Pat. No. 9,813,489), which claims the benefit of and priority to provisional application No. 61/992,307, filed May 13, 2014, and to provisional application No. 62/136,959, filed Mar. 23, 2015. Each of the above identified applications is incorporated herein by reference in its entirety.

BACKGROUND

Field

The present disclosure relates generally to sensor applications, including a system, method and apparatus for enabling a shared infrastructure.

Introduction

Sensors can be used to monitor physical or environmental conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing the state of physical or environmental conditions. Wireless sensor networks provide an efficient mechanism for connecting with and retrieving sensor data from a distributed set of sensors. The growing emphasis on the Internet of Things (IoT) has further reinforced the importance of wireless networks in connecting a range of devices. Notwithstanding today's emphasis on connecting a variety of devices using wireless communication, it is recognized in the present disclosure that the penetration of wireless sensor networks into the marketplace is limited due to the high level of installation and maintenance costs.

By their very nature, sensors are designed to measure a particular physical or environmental condition. Sensors therefore represent a class of application-specific devices. Every sensor network installation can be designed with unique cost constraints, measurement objectives, site restrictions, or other application-specific requirements that can influence sensor network design. These application-specific qualities lead to significant challenges in identifying a scalable solution that can be applied across various industries and markets. For example, it is recognized that a scalable solution should be flexible in accommodating new types of sensor applications with little redesign or redeployment of a wireless sensor network. Such a scalable solution would significantly reduce installation and maintenance costs as new sensors and application features are rolled out across an already deployed sensor network infrastructure. It is recognized that sensor network solutions should enable an evolution of the deployed wireless sensor network without wasting previously-deployed wireless sensor network elements or requiring significant time or expense in modifying the previously-deployed wireless sensor network.

Figure 1:
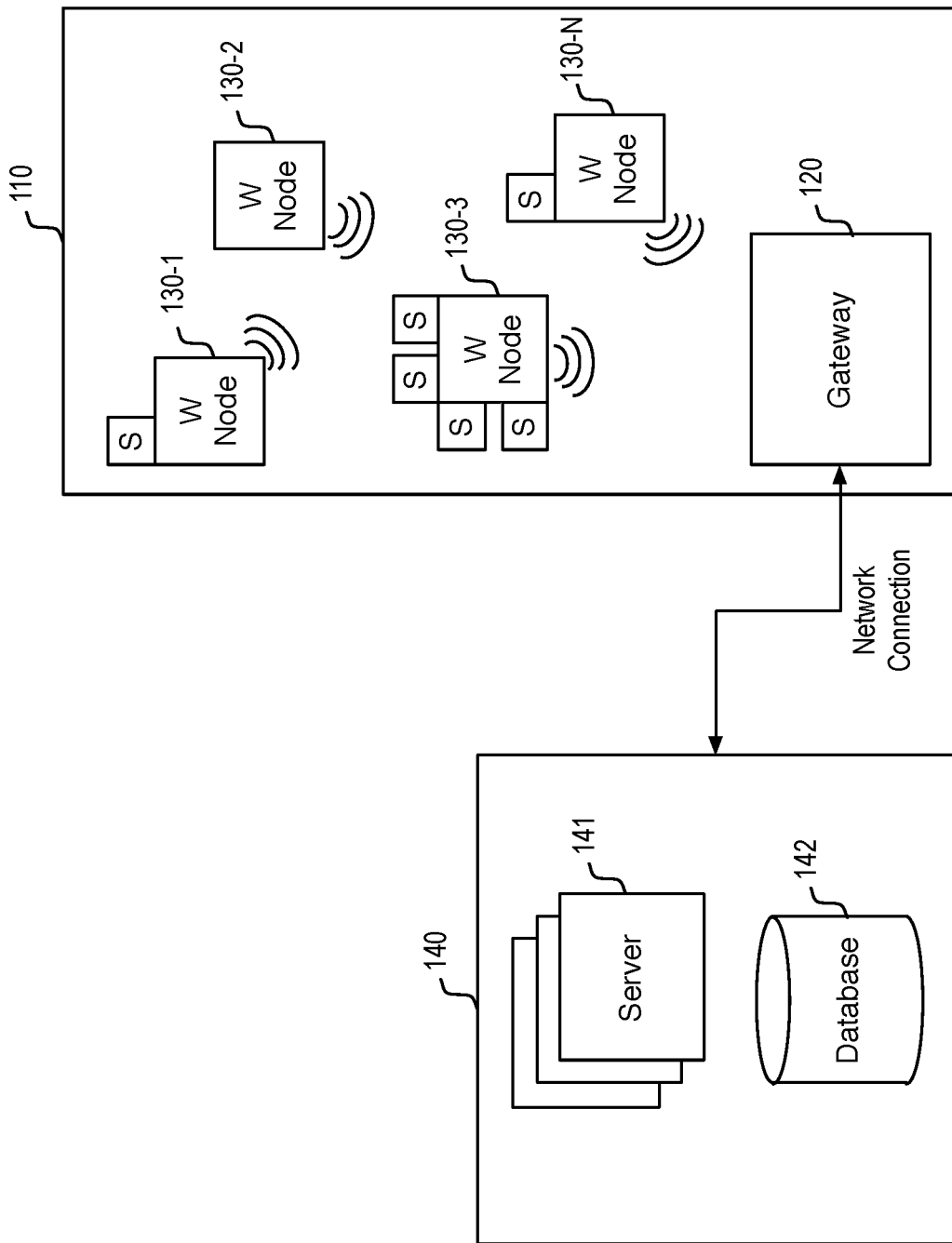
FIG. 1 illustrates an example embodiment of a wireless sensor network that can collect and distribute sensor information.

FIG. 1 illustrates an example embodiment of a wireless sensor network that can collect and distribute sensor information. The wireless sensor network can be configured to collect and distribute sensor information that is based on measurements by sensors deployed at monitored location 110. Monitored location 110 can represent any area where a collection of sensors is deployed. Monitored location 110 may or may not represent a physical area having clearly defined boundaries. As would be appreciated, the extent of the monitoring application itself provides a sense of boundary to monitored location 110. In one example, monitored location 110 can represent a building such as a home, hotel, school, community building, stadium, convention center, warehouse, office building, multi-dwelling unit, or other defined building structure. In another example, monitored location 110 can represent an area of control such as a monitored area that can be fixed or movable.

Disposed within monitored location 110 is a plurality of sensors. Communication between the plurality of sensors and gateway device 120 is facilitated by a set of wireless nodes 130-$n$. In general, wireless nodes 130-$n$ can be configured to form a wireless mesh network. In one embodiment, the communication protocol between wireless nodes 130-$n$ is based on the IEEE 802.15.4 protocol. A wireless mesh network can be formed between wireless nodes 130-$n$ and can be used to facilitate communication between any wireless node 130-$n$ and gateway device 120.

A wireless node 130-$n$ can be configured to support one or more sensor module units (S), each of which can be individually coupled to a wireless node 130-$n$ via a plugand-play universal sensor interface. The plug-and-play universal sensor interface facilitates the separation of the wireless node communication infrastructure from the set of one or more sensor module units that are deployed at the location at which the supporting wireless node 130-*n* is installed. This separation creates significant flexibility in choice of sensors that may or may not be deployed proximate to the time of installation of the supporting wireless node 130-*n*. As such, the plug-and-play universal sensor interface enables a sensor network solution to respond to changes in the sensor application requirements at monitored location 110 without incurring significant re-deployment costs.

This flexibility would not be available if sensors were integrated with a wireless node. When a wireless node is deployed with integrated sensors, the monitoring capability of the wireless node is limited to the sensors that were pre-installed in the wireless node. This pre-installation would fix the capability of the wireless node at the time of deployment and would limit the wireless node to a static sensor application objective. Thus, if a defective sensor needs to be replaced, or if another type of sensor needs to be added to meet a dynamic sensor application objective, then the wireless node would need to be replaced or otherwise modified. This would impact at least part of the wireless sensor network infrastructure, which can result in sensor network downtime at the monitored location. A further impact would be produced as the maintenance expense of such a replacement or modification would be prohibitive.

In the present disclosure, the plug-and-play universal sensor interface enables the sensor module units to be deployed separately from wireless nodes 130-*n*. The plug-and-play universal sensor interface allows any type of sensor module unit to be connected to any wireless node 130-*n* at any time and without any reconfiguration of the supporting wireless network infrastructure. This feature allows great flexibility in the deployment and modification of wireless sensor networks at a lower price point. Additionally, the plug-and-play universal sensor interface enables the monitoring capabilities of the wireless sensor network to scale seamlessly with the dynamic nature of changing sensor application objectives.

In one example, a wireless node 130-*n* can be configured to support four sensor module units. As would be appreciated, the particular number of sensor module units that can be supported by a wireless node 130-*n* can vary. Sensor module units can be added onto wireless nodes 130-*n* sequentially at different deployment times. Thus, for example, a first sensor module unit can be added at a time of installation of the wireless node 130-*n*, with one or more additional sensor module units added to the same wireless node 130-*n* in the future as needed to address changing sensor application objectives.

In one embodiment, each of the sensor module units can support a plurality of individual sensors. In one example, a sensor module unit can support a set of eight sensors. In this example, the set of eight sensors can include sensors of one or more types. For example, sensors in a sensor module unit can include one or more of the following: a temperature sensor, a humidity sensor, an air quality sensor (e.g., $CO_2$ sensor), a light sensor, a sound sensor, a contact sensor, a pulse sensor, a water sensor, or any other type of sensor configured to measure a characteristic of a part of monitored location 110. A sensor module unit can include multiple sensors of a single type. For example, a particular configuration of a sensor module unit can include four pulse sensors, one temperature sensor, one humidity sensor, one air quality sensor, and one light sensor. In another example, a particular configuration of a sensor module unit can include eight sensors of a single type. As would be appreciated, the set of sensors included within a particular sensor module unit can be chosen to meet a given sensor application objective.

In the present disclosure, it is recognized that sensor module units can be targeted or otherwise designed for a particular class of sensor applications. For example, one sensor module unit can be designed for sensor applications targeted to school buildings, while another sensor module unit can be designed for sensor applications targeted to office buildings. The sensor module unit targeted for school building use can include a set of sensors that are popular with school building sensor applications. For instance, the set of sensors can include pulse sensors for measuring utility consumption (e.g., gas, water, electricity), a temperature sensor, an air quality sensor, a humidity sensor and a light sensor. The sensor module unit targeted for school building use can then be selected for installation with wireless nodes deployed in school buildings. In this manner, a relatively generic sensor module unit can be deployed across many sensor application deployments in various schools without requiring full customization for a specific application at a particular school. Production costs of the sensor module units are thereby minimized without any loss of flexibility in deploying customized sensor module units.

The impact on economies of scale can be readily appreciated. Wireless node modules can be produced on a larger manufacturing scale because the generic wireless nodes can be applied in many types of monitored locations in a manner that is separate from the particular sensor objectives at the particular monitored location. Correspondingly, a limited number of types of sensor module units can be manufactured. For example, a first sensor module unit type can be produced for office building applications and can include a suite of sensors typically used in office buildings. Similarly, a second sensor module unit type can be produced for school building applications and can include a suite of sensors typically used in school buildings.

In the deployment at a particular monitored location, the generic wireless nodes can be installed at the particular monitoring points in the monitored location with the particular type of sensor module unit attached to the generic wireless node to meet the particular needs at that monitoring point. Customization of this nature is far superior to the limited options presented by integrated devices. Customization need not result in wireless sensor network downtime and can be effected through the selective coupling of particular sensor module units to wireless nodes.

A further benefit of this form of customization is that it obviates the need to re-qualify and test wireless nodes to meet a new sensor application. Qualification need only be performed on new sensor module units since the existing wireless network infrastructure provided by the generic wireless nodes had previously been qualified and tested. This reduces the time needed to bring new sensor network features to market in addressing new market opportunities. If, on the other hand, sensors were integrated with the wireless nodes, then the entire device would need to be re-qualified and tested before being brought to market. As described, the plug-and-play universal sensor interface enables sensor network application customization without increasing installation and maintenance costs of the sensor network infrastructure.

Returning to FIG. 1, wireless node 130-1 is illustrated as supporting a single sensor module unit (S). Wireless node 130-2, on the other hand, is illustrated as not supporting any sensor module units. This example illustrates a scenario where wireless node 130-2 has been specifically installed as a wireless relay node in a wireless mesh network to facilitate a connection between wireless node 130-1 and gateway 120. As further illustrated, wireless node 130-3 supports four different sensor module units (S). This example illustrates a scenario where the sensing needs of a particular part of monitored location 110 is greater and would therefore require additional installed sensors at the location of wireless node 130-3. For instance, wireless node 130-3 can be installed in a hub of sensing activity at monitored location 110, while wireless node 130-1 or wireless node 130-N can be installed in a periphery of sensing activity at monitored location 110. The plug-and-play universal sensor interface enables sensor module unit deployment to match sensor application needs in a manner that scales seamlessly with the deployed wireless network infrastructure. Deployment and maintenance costs are thereby contained.

The wireless mesh network created by wireless nodes 130-n facilitates communication between sensor module units and gateway 120 via the wireless network infrastructure established by wireless nodes 130-n. Gateway 120 can be installed at monitored location 110 and can be provided with network connectivity. For example, gateway 120 can be provided with a network connection that facilitates communication of sensor data to host system 140. The network connection can be embodied in various forms depending upon the particular characteristics of monitored location 110.

For example, where monitored location 110 is a building in a developed area, then the network connection can be facilitated by a wired Internet connection via an Internet service provider. In another example, where monitored location 110 represents a remote physical area (or movable area) that may or may not include a building structure, then the network connection can be facilitated by a terrestrial or satellite based wireless network. As would be appreciated, the principles of the present disclosure would not be dependent on the particular form of network connection supported by gateway 120 in communicating with host system 140.

The network connection between gateway 120 and host system 140 enables the collection of sensor data by host system 140. In one embodiment, host system 140 can be located in a location remote from gateway 120. In general, host system 140 can be configured to perform a collection of sensor data from monitored location 110, storage of sensor data in database 142, and a distribution of sensor data to one or more destinations. As illustrated, host system 140 can include one or more servers 141 that can facilitate the collection, storage and distribution processes.

Figure 2:
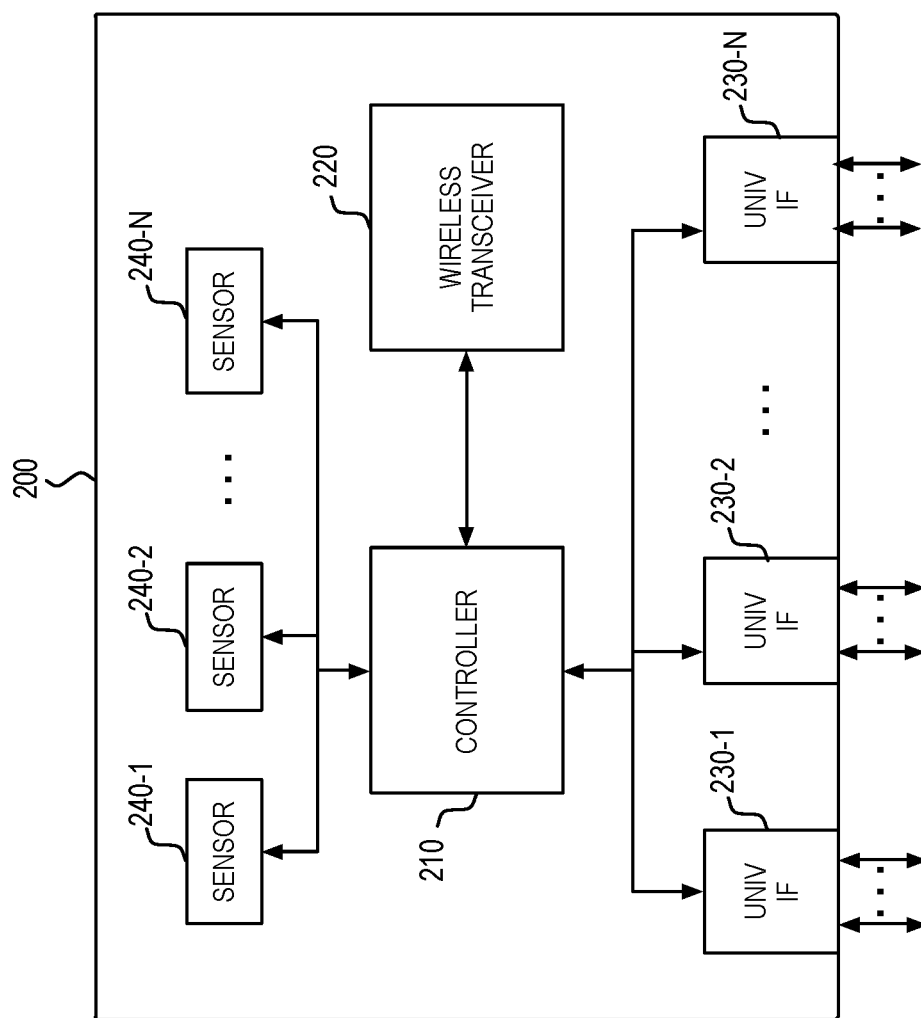
FIG. 2 illustrates an example embodiment of a wireless node.

As described, wireless nodes 130-n provide a wireless network infrastructure upon which sensor module units can be deployed for a customized sensor application. FIG. 2 illustrates an example embodiment of a wireless node. As illustrated, wireless node 200 includes controller 210 and wireless transceiver 220. In one embodiment, wireless node 200 can be powered via a battery source (not shown). In another embodiment, wireless node 200 can be powered via an external power source available at the point of installation at the monitored location.

Wireless transceiver 220 facilitates wireless communication between wireless node 200 and a gateway or another wireless node that operates as a relay between wireless node 200 and the gateway. The sensor data communicated by wireless transceiver 220 is collected by controller 210 via one or more universal sensor interfaces 230-n. Each universal sensor interface 230-n can support connection of wireless node 200 with a separate sensor module unit that can be attached to wireless node 200.

Universal sensor interfaces 230-n can represent a combination of hardware and software. The hardware portion of universal sensor interfaces 230-n can include a wired interface that enables communication of different signals between wireless node 200 and a connected sensor module unit. In one example, the wired interface can be enabled through a connector interface, which is exposed by the housing of the wireless node 200, and that is configured to receive a sensor module unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 210 in wireless node 200 to select the particular sensor module unit with which wireless node 200 desires to communicate. The software portion of the universal sensor interfaces 230-n can include a protocol that allows wireless node 200 to communicate with a sensor module unit.

In one example protocol, controller 210 can be configured to poll the various universal sensor interfaces 230-n to determine whether any sensor module units are connected. As part of this protocol, controller 210 can first request a sensor ID from a sensor module unit. If the response read is 0, then controller 210 would know that no sensor module unit is connected to that universal sensor interface 230-n. If, on the other hand, the response read is not 0, then controller 210 would ask for the number of data values that have to be retrieved and the number of bits on which the data values are coded. In one example, the higher order 8-bits of a 16-bit communication between controller 210 and a sensor module unit identifies the number of data values, while the lower order 8-bits of the 16-bit communication identifies the number of bits used to code each data value. Based on the number of data values to be retrieved, controller 210 would then collect that number of data values, wherein each value can represent a different sensor channel of the sensor module unit.

In one example, a wireless node can be configured for coupling to four different sensor module units. If each of the sensor module units can include up to eight sensors, then the wireless node can be configured to communicate 32 sensor channels of data to the gateway via wireless transceiver 220.

In the illustration of FIG. 2, wireless node 200 also includes one or more sensors 240-n. In one example, sensors 240-n can be contained within or otherwise supported by the housing of wireless node 200. In various scenarios, the one or more sensors 240-n can facilitate monitoring at that part of the monitored location, including the health and/or status of wireless node 200. In one example configuration, sensors 240-n can include a temperature sensor, a humidity sensor, a voltage sensor, a link quality sensor, or any other sensor that can be used to facilitate the sensing needs of wireless node 200.

As noted, wireless nodes can be designed as a generic communication node upon which customized sensing functionality can be added through the connection of particular sensor module units. In this framework, the wireless nodes can be constructed with base communication functionality that can operate independently of particular sensors. As such, the wireless nodes can provide a relatively stable wireless network infrastructure that can support multiple generations of sensor module units. As would be appreciated, the requirements of the sensor module units would be dependent on the particular sensing application. For example, a first sensor module unit can be designed with a first generation sensor having a first degree of accuracy, reliability, or other sensor characteristic, while a second sensor module unit can be designed with a second generation sensor of the same type having a second degree of accuracy, reliability, or other sensor characteristic. As this example illustrates, different generations of sensor module units can be attached to the same wireless node using the plug-and-play universal sensor interface. The original investment in the wireless node would not be lost should the second sensor module unit replace the originally-installed first sensor module unit. A low-cost evolutionary path of the wireless sensor network would therefore be enabled that could scale seamlessly with a customer's needs, sensor technology, or other factor that implicates a sensor module unit modification.

Figure 3:
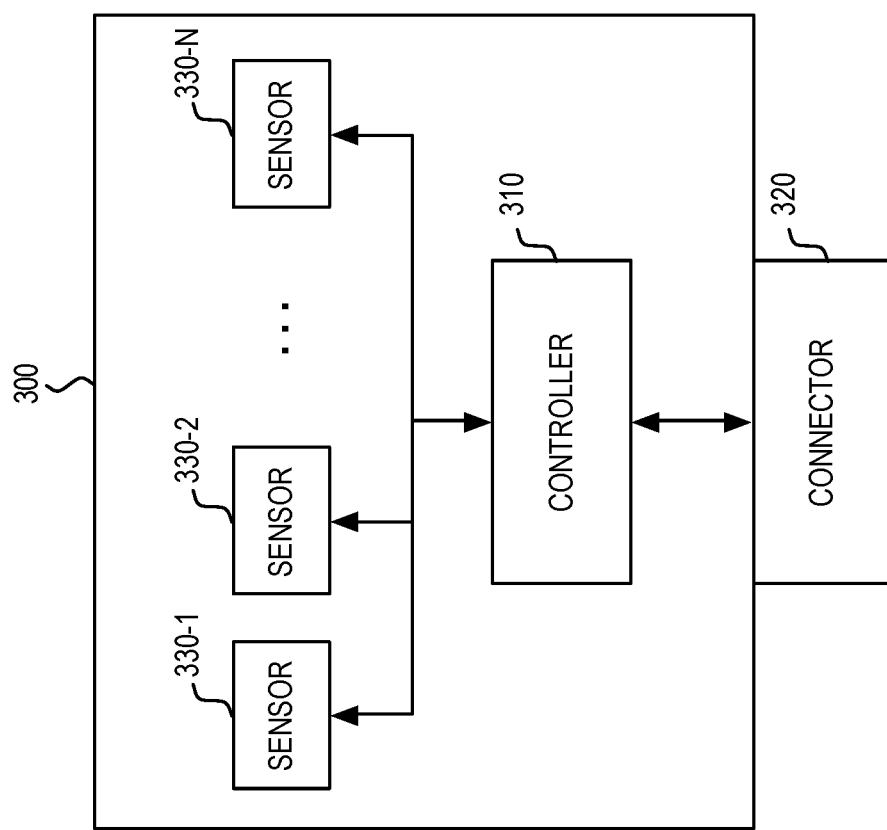
FIG. 3 illustrates an example embodiment of a sensor module unit.

FIG. 3 illustrates an example embodiment of a sensor module unit designed for attachment to a wireless node. As illustrated, sensor module unit 300 includes controller 310 that communicates over a universal sensor interface with the wireless node. In one embodiment, sensor module unit 300 supports a connector 320 configured for pluggable, removable insertion into a connector interface exposed by the wireless node. In another embodiment, the sensor module unit can be coupled to the connector interface exposed by the wireless node via a connector attached to a cable.

Sensor module unit 300 can include a plurality of sensors 330-n. In one example, sensor module unit 300 includes up to eight sensors of one or more types. In the present disclosure, it is recognized that a sensor module unit can be pre-populated with a suite of sensors targeted to a particular class of sensor applications. In this framework, a first suite of sensors can be used in a first sensor module unit targeted to a first sensor application (e.g., school buildings), while a second suite of sensors can be used in a second sensor module unit targeted to a second sensor application (e.g., office buildings) different from the first sensor application. Here, the underlying wireless network infrastructure can remain the same while particular sensor module units are chosen for coupling to one or more wireless nodes to facilitate a particular sensor application at a monitored location.

Figure 4:
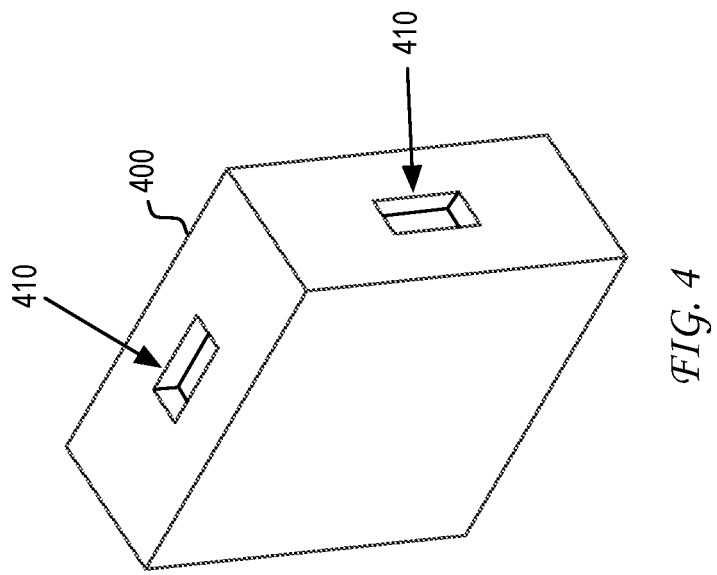
FIG. 4 illustrates an example embodiment of a housing of a wireless node that exposes connector interfaces.

The plug-and-play nature of the connection of sensor module units to supporting wireless nodes facilitates a modular framework of installation of a wireless sensor network. FIG. 4 illustrates an example embodiment of a housing of a wireless node that exposes a plurality of connector interfaces to produce the modular framework. As illustrated, wireless node 400 can have a housing configured to expose a plurality of connector interfaces 410. Each of the plurality of connector interfaces 410 can support the physical attachment of a single sensor module unit. In the example illustration, each side of the housing of wireless node 400 exposes a single connector interface 410. In the present disclosure, it is recognized that the housing of the wireless node can be substantially larger than the housing of the sensor module unit. This can result, for example, because the wireless node can be designed with additional components such as an internal power source (e.g., battery) that can involve additional volume requirements as compared to the sensor module units. It is therefore recognized that one embodiment of a wireless node can have multiple sensor module units physically attached to a single side of the wireless node.

Figure 5:
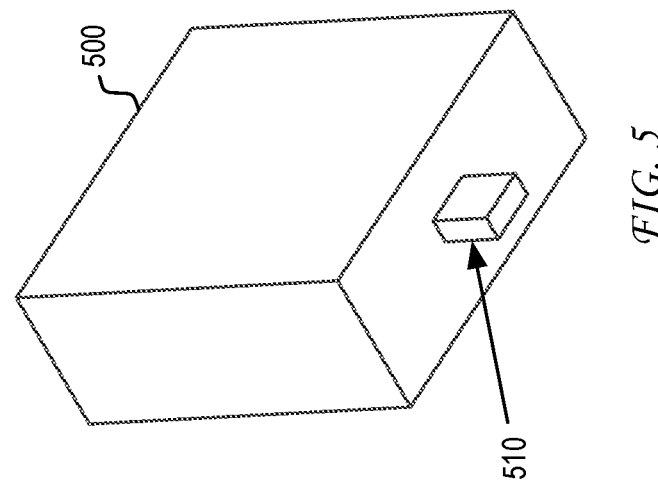
FIG. 5 illustrates an example embodiment of a housing of a sensor module unit.

FIG. 5 illustrates an example embodiment of a housing of a sensor module unit that enables the modular framework. As illustrated, sensor module unit 500 supports a connector 510 that can be configured for pluggable, removable insertion into a corresponding connector interface 410 exposed by the housing of wireless node 400. The connection of sensor module unit 500 to wireless node 400 via the insertion of connector 510 into connector interface 410 produces a true plug-and-play framework of wireless sensor network deployment.

Figure 6:
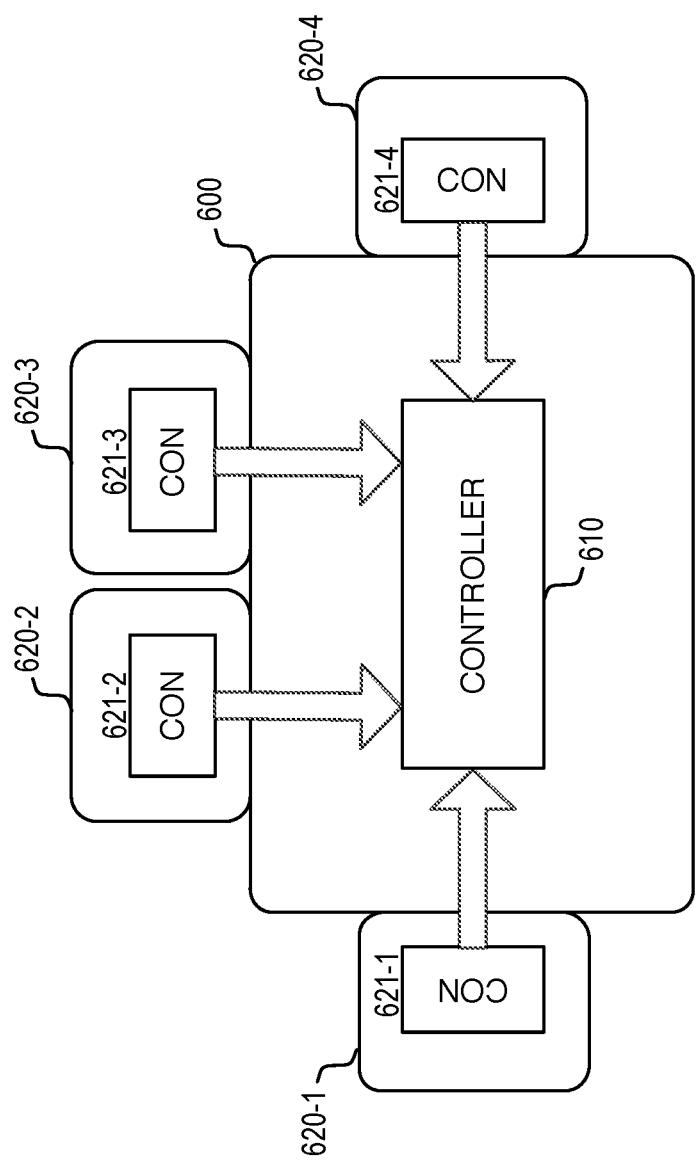
FIG. 6 illustrates an example embodiment of a wireless node that is physically attached to a plurality of sensor module units.

FIG. 6 illustrates an example embodiment of a wireless node that is physically attached to a plurality of sensor module units via universal sensor interfaces. As illustrated, wireless node 600 is attached to sensor module unit 620-1, sensor module unit 620-2, sensor module unit 620-3, and sensor module unit 620-4 via four connector interfaces exposed by the housing of wireless node 600. The attachment of sensor module unit 620-1 to wireless node 600 enables communication of sensor data between controller 621-1 and controller 610. The attachment of sensor module unit 620-2 to wireless node 600 enables communication of sensor data between controller 621-2 and controller 610. The attachment of sensor module unit 620-3 to wireless node 600 enables communication of sensor data between controller 621-3 and controller 610. Finally, the attachment of sensor module unit 620-4 to wireless node 600 enables communication of sensor data between controller 621-4 and controller 610. Each of sensor module units 620-1 to 620-4 can be coupled to wireless node 600 via a separate universal sensor interface having the connectivity characteristics described above.

Controller 610 in wireless node 600 can communicate with each of sensor module units 620-1 to 620-4 to retrieve sensor data generated by one or more sensors on the respective sensor module units 620-1 to 620-4. In one embodiment, the sensor channels of data that are communicated from sensor module unit 620-n to wireless node 600 are configurable. As noted, communication between controller 610 and the sensor module units 620-1 to 620-4 can be based on a protocol that enables identification of the number of data values that are transmitted from each of sensor module units 620-1 to 620-4 to controller 610.

In one embodiment, a sensor module unit can be configured to transmit data from only a subset of the sensors on the sensor module unit. To illustrate this embodiment, consider again the example of a sensor module unit targeted for school building use. In this example, the sensor module unit can include a standard suite of eight sensors, including four pulse sensors for measuring utility consumption (e.g., gas, water, electricity), a temperature sensor, an air quality sensor, a humidity sensor and a light sensor. Individual sensors in this standard suite of sensors can be activated selectively such that only a subset of the sensor channels of data is forwarded from the sensor module unit to the wireless node.

Here, it is recognized that the selective transmission of sensor channels of data can be used to support efficient wireless bandwidth use or reduced power consumption within the wireless sensor network at the monitored location. Moreover, the selective transmission of sensor channels of data can support a billing model where customers pay per sensor channel stream of data that is exposed by the host system to the customer. It is a feature of the present disclosure that sensor channels of data can be selectively distributed to customers. This selective distribution of sensor channels of data reflects the divergent interests and needs of customers in the sensor channels of data produced at a monitored location.

To illustrate this concept, consider an example of a monitored location that represents an office building. An office building can be viewed using various segments of control, wherein each segment of control may or may not correspond to a defined physical space of the office building. For example, the office building may have multiple tenants that lease office space in the building, a restaurant that leases space in the ground level of the office building, a building supervisor responsible for the maintenance of the office building, a concierge responsible for the administration of common space in the office building, and additional parties having at least partial responsibility of a segment of a space or resource in the office building. Each of the parties in this example can have different responsibilities in the office building, and therefore can have different interests/needs with respect to sensor channels of data generated by the various sensors installed at the office building.

It is a feature of the present disclosure, that parties having different responsibilities at a monitored location can be given a partial view of the totality of the sensor channels of data generated by the various sensors installed at the monitored location. Their partial views would correspond with their particular responsibilities and interests/needs at the monitored location. Notably, these partial views would not necessarily correspond to physical space, which are typically divided along the boundaries defined by a signed lease. For example, an office building tenant may have an interest in the information generated by light sensors in their leased space, but may not have an interest in the amount of power consumed or the amount of water consumed by their leased space. The utility consumption information may be needed by an office building supervisor and/or a billing coordinator that attributes the costs of the total utility consumption amongst individual tenants of the office building. In another example, a building can have a sensor associated with a main electricity meter and sensors associated with the various sub-meters at each floor/unit in the building. In this scenario, the utility consumption information based on the various sub-meters can be provided to individual parties that have responsibility for each floor/unit.

Figure 7:
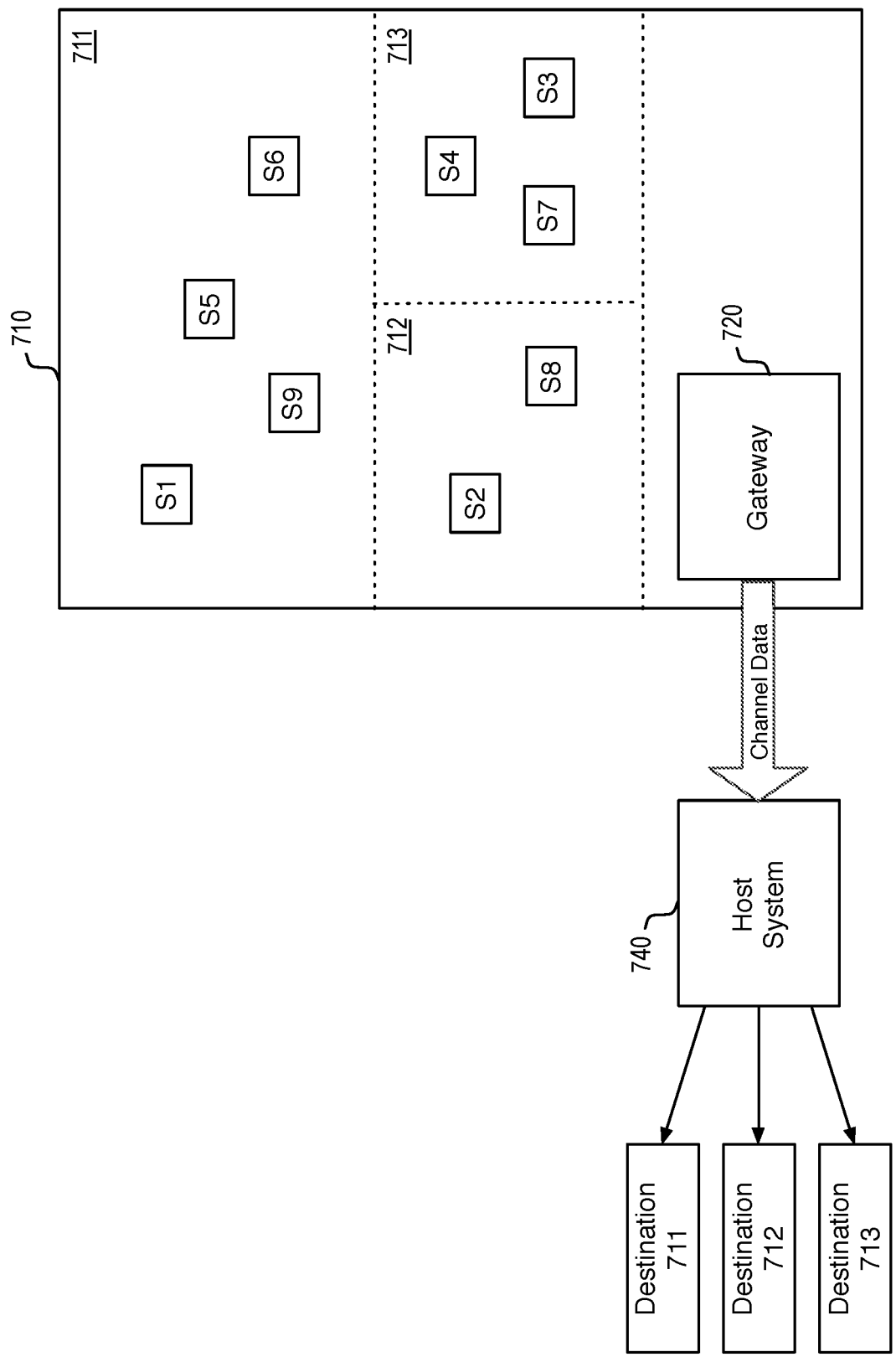
FIG. 7 illustrates an example of a shared infrastructure at a monitored location.

FIG. 7 illustrates an example of a shared infrastructure reflective of different interests/needs at a monitored location. As illustrated, monitored location 710 includes a plurality of sensors S1-S9 that generate sensor channels of data that are communicated to host system 740 via gateway 720. Sensors S1-S9 are not illustrated as being associated with particular sensor module units or wireless nodes. Rather, to illustrate the logical associations, sensors S1-S9 are illustrated as being individually associated with particular monitoring views 711, 712, 713 associated with monitored location 710. This results because two sensors on a single sensor module unit can be associated with different monitoring views.

Each monitoring view 711, 712, 713 can be associated with a separate destination, which receives a defined subset of the total sensor channels of data generated by sensors S1-S9 at monitored location 710. In the example of FIG. 7, monitoring view 711 is associated with destination 711, which host system 740 would provide with the sensor channels of data associated with sensors S1, S5, S6 and S9; monitoring view 712 is associated with destination 712, which host system 740 would provide with the sensor channels of data associated with sensors S2 and S8; and monitoring view 713 is associated with destination 713, which host system 740 would provide with the sensor channels of data associated with sensors S3, S4 and S7.

In this framework, monitoring views 711, 712, 713 may or may not represent distinct physical parts of monitored location 710. In one scenario, each of monitoring views 711, 712, and 713 can roughly correspond to different physical parts of monitored location 710 that are leased to different parties. More generally, monitoring views 711, 712 and 713 can represent logically separate parts of monitored location 710. For example, a first logical part of the monitored location can represent an interest in temperature information at the monitored location, while a second logical part of the monitored location can represent an interest in electricity consumption information at the monitored location. As would be appreciated, there is no limitation on the number of different monitoring views that can be established for the monitored location. Moreover, subsets of sensors that are defined for each monitoring view need not be mutually exclusive. For example, one sensor can be associated with more than one monitoring view.

Distinct monitoring views can be established based on a remote configuration process. In this remote configuration process, a subset of the sensor channels of data can be defined in association with an individual destination. The defined subset of the sensor channels of data can then be used to filter the sensor channels of data that are chosen for delivery to the destination.

Figure 8:
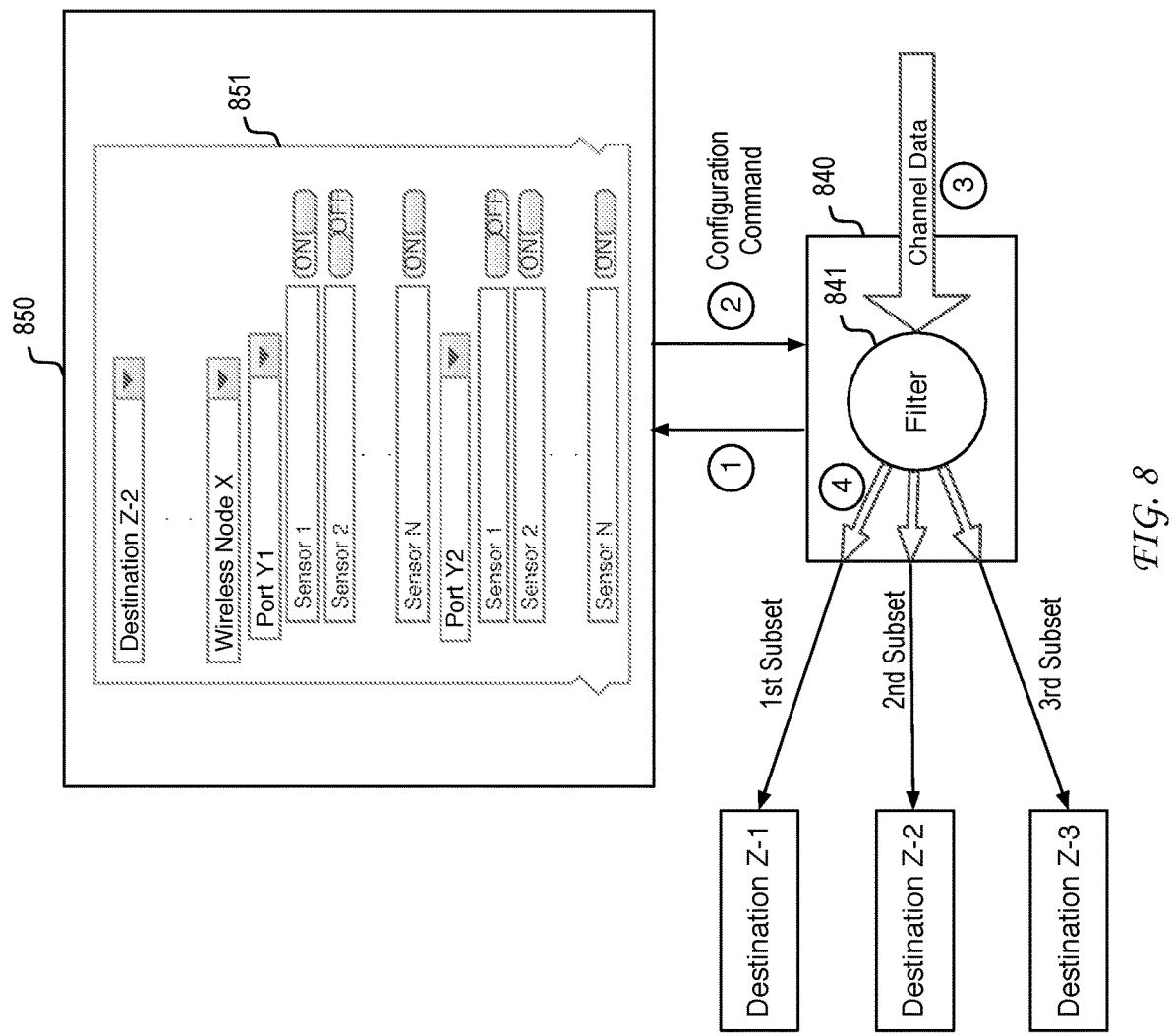
FIG. 8 illustrates an example embodiment of a remote configuration of a shared infrastructure application.

FIG. 8 illustrates an example embodiment of a remote configuration of a shared infrastructure application that enables the association of a subset of the sensor channels of data with a destination. In the illustrated example, a collection of sensor channels of data can be selected on a per destination basis. In an alternative embodiment, one or more destinations can be selected on a per sensor channel of data basis. In general, a destination can represent a report location at which a set of subscribing users can view sensor channel information associated with the destination. The creation of distinct destinations to receive selected sensor channel information enables the creation of a shared infrastructure for the administration of the monitored location. In one example, the destination can represent a dashboard (e.g., website location) where a set of subscribing users can view sensor channel information associated with the destination.

As illustrated, configuration station 850 (e.g., personal computer, tablet, mobile phone, or other computing device) supports the provision of a user interface 851 that enables a user to associate particular sensor channels of data with a particular destination. In one example, a settings module supported by host system 840 can transmit computer readable program code (communication 1) from a server device to configuration station 850 that enables configuration station 850 to render user interface 851. Through the interaction by the user with user interface 851 on configuration station 850, the user can specify the details of the subset of sensor channels of data that should be associated with a destination. As noted, this association of sensor channels of data with a destination would effect a change in the selection and forwarding of sensor channels of data by host system 840.

User interface 851 enables a user to specify a particular destination. In various embodiments, the destination can be specified using a customer ID, a pseudo-name for the customer, or any other mechanism that enables individual identification of a destination. The specification of a particular destination can also be facilitated by a grouping of destinations per monitored location. In the illustrated example of FIG. 8, the user has specified the distinct destination labeled as "Destination Z-2".

After identification of Destination Z-2, user interface 851 would then enable the user to identify particular sensors channels of data to associate with Destination Z-2. In general, this process can be facilitated through a systematic identification of sensor channels of data at one or more monitored locations. In the illustrated example, this systematic process is facilitated on a wireless node basis, wherein individual association decisions can be made for each sensor channel of data supported by each sensor module unit attached to the wireless node. As would be appreciated, any systematic process can be used that would enable association of one or more sensor channels of data with a destination.

In the illustrated example, after identification of Wireless Node X, user interface 851 would then enable the user to identify a particular port of Wireless Node X. The identification of "Port Y1" would correspond to the sensor module unit attached to port Y1 of Wireless Node X at the monitored location. For the sensor module unit attached to port Y1, the user can then specify that the sensor channel of data associated with Sensor 1 should be associated with Destination Z-2, the sensor channel associated with Sensor 2 should not be associated with Destination Z-2, . . . , and the sensor channel associated with Sensor N should be associated with Destination Z-2. Similarly, for the sensor module unit attached to port Y2, the user can specify that the sensor channel associated with Sensor 1 should not be associated with Destination Z-2, the sensor channel associated with Sensor 2 should be associated with Destination Z-2, . . . , and the sensor channel associated with Sensor N should be associated with Destination Z-2.

As described, the collection of sensor channels of data that are associated with a specific destination can be chosen from different sensor module units attached to a single wireless node. As would be appreciated, sensor channels of data from sensor module units attached to different wireless nodes at the same or different monitored location can also be associated with the same destination.

Through user interface 851, a user can individually associate sensor channels of data to different destinations. The association of sensor channels of data to destinations is not constrained by the sensor module unit or wireless node that produces the sensor channel of data. Thus, for example, a first sensor channel of data from a sensor module unit can be associated with a first destination, while a second sensor channel of data from the same sensor module unit can be associated with a second destination different from the first destination. As would be appreciated, a single sensor channel of data can be associated with one or more destinations.

Through the interaction by a user with user interface 851, the associations between the sensor channels of data and the destinations would be specified. The specification of the association between the sensor channels of data and the destinations can then be returned as a configuration command (communication 2) to host system 840. In one embodiment, host system 840 can store an association between the sensor channels of data and the destinations in a database based on the received configuration command. In one example, the destination association for each sensor channel of data can be stored in accordance with an identifier based on a gateway identifier, a wireless node identifier, a port identifier and a sensor identifier.

Based on the remotely-configured association between the sensor channels of data and the destinations, host system 840 can then generate configuration setup information for the filtering of the sensor channels of data to the various destinations. In one embodiment, host system 840 would use the generated configuration setup information to establish filter 841 at host system 840. Host system 840 can then use filter 841 in determining how to forward sensor information based on the sensor channels of data to individual destinations.

In one embodiment, host system 840 would retrieve the shared infrastructure definition represented by filter 841 from the database to identify how host system 840 should process sensor channels of data that are received from the monitored location (communication 3). In one example, the received sensor channels of data can include data from all of the sensors installed or otherwise activated at one or more monitored locations. Using the shared infrastructure definition represented by filter 841, host system 840 can then filter the sensor information based on the received sensor channels of data for forwarding to particular destinations (processing 4). In the example illustration, host system 840 uses the shared infrastructure definition represented by filter 841 to direct a first subset of the sensor information to destination Z-1, a second subset of the sensor information to destination Z-2, and a third subset of the sensor information to destination Z-3. Each destination is therefore provided with a customized slice of the sensor information produced from the sensor channels of data generated by sensors at one or more monitored locations.

As described, host system 840 can enable users to specify a shared infrastructure definition that can be applied to every sensor in every sensor module unit attached to every wireless node at a monitored location. By this shared infrastructure specification, effective configuration and/or reconfiguration of the reporting of sensor information can be performed after installation of a wireless sensor network at a monitored location.

Figure 9:
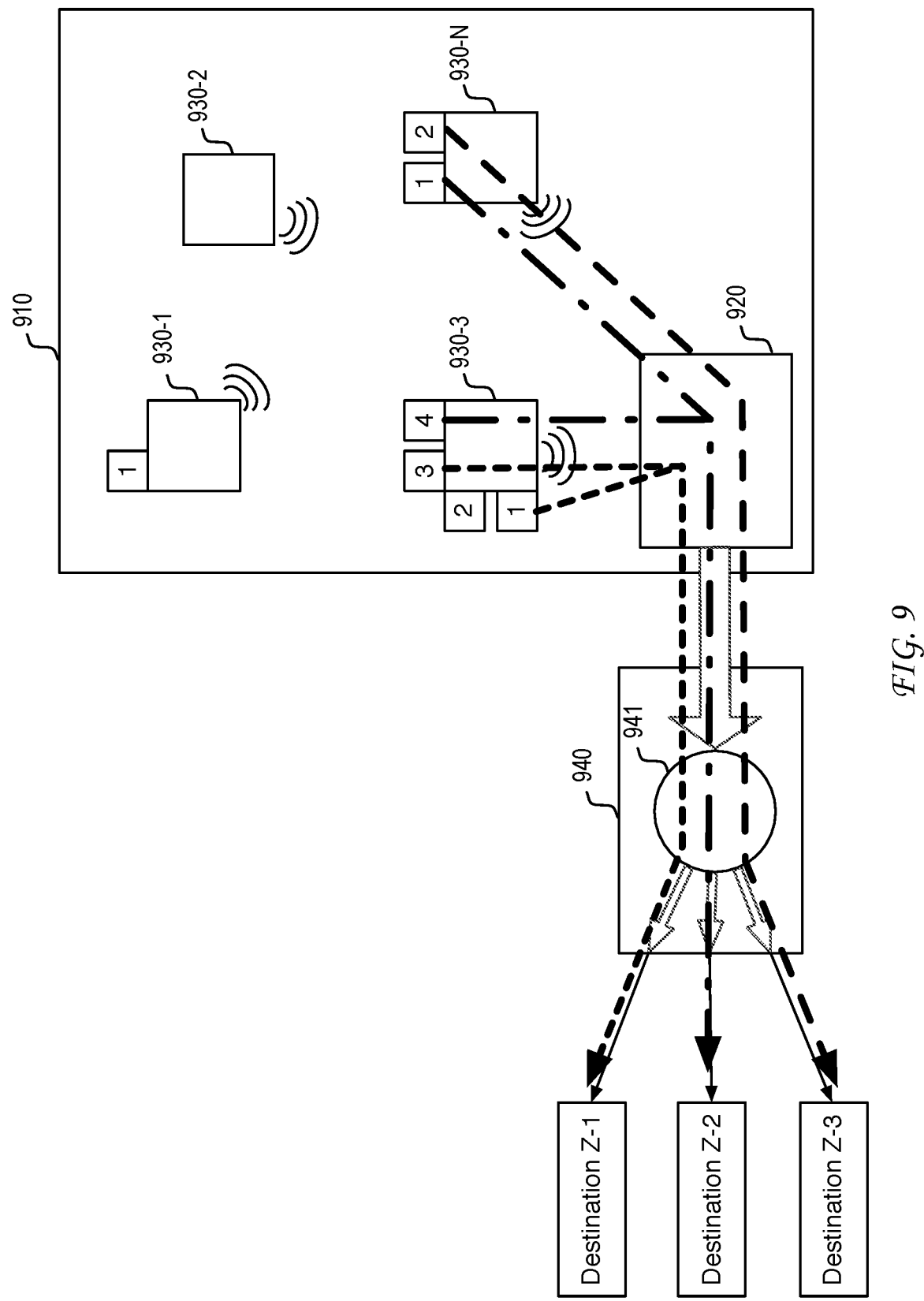
FIG. 9 illustrates a first example routing of sensor channels of data in a shared infrastructure application.

FIG. 9 illustrates a first example of the effect of the remote configuration of a shared infrastructure application. As illustrated, monitored location 910 includes a plurality of wireless nodes 930-*n* that communicate with host system 940 via gateway 920. Wireless node 930-3 is attached to four sensor module units 1, 2, 3, 4, while sensor module unit 930-N is attached to two sensor module units 1, 2. For simplicity, assume that each sensor module unit includes a single sensor.

As described above, a shared infrastructure definition represented by filter 941 can be remotely configured using a configuration station. This shared infrastructure definition can be designed to effect the following example forwarding of sensor information: (1) the sensor channel of data from the sensor in sensor module unit 1 attached to wireless node 930-3 and the sensor channel of data from the sensor in sensor module unit 3 attached to wireless node 930-3 are both routed to Destination Z-1, (2) the sensor channel of data from the sensor in sensor module unit 4 attached to wireless node 930-3 and the sensor channel of data from the sensor in sensor module unit 1 attached to wireless node 930-N are both routed to Destination Z-2, and (3) the sensor channel of data from the sensor in sensor module unit 2 attached to wireless node 930-N is routed to Destination Z-3.

Figure 10:
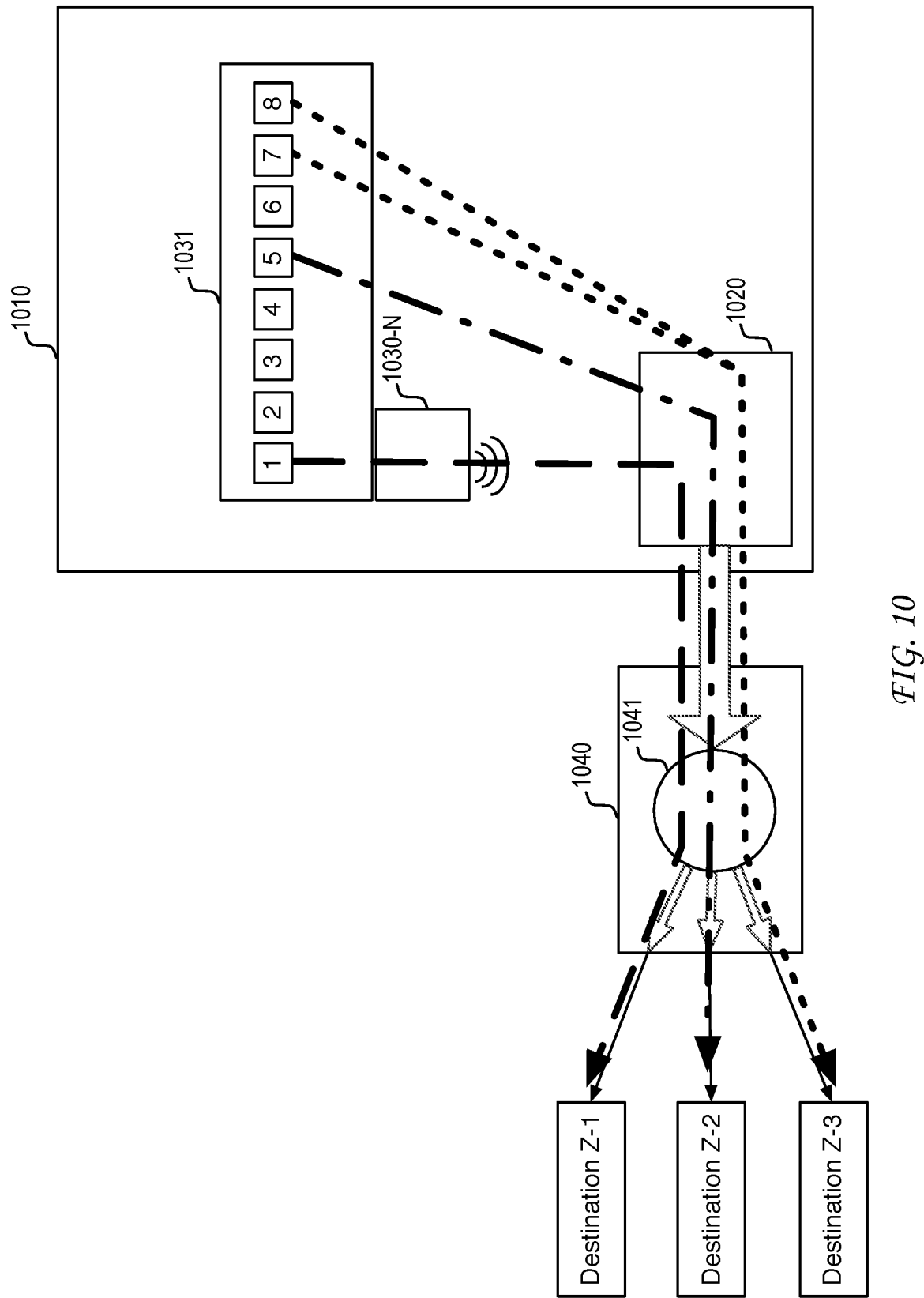
FIG. 10 illustrates a second example routing of sensor channels of data in a shared infrastructure application.

FIG. 10 illustrates a second example of the effect of the remote configuration of a shared infrastructure application. As illustrated, monitored location 1010 includes wireless node 1030-N that communicates with host system 1040 via gateway 1020. Wireless node 1030-N is attached to a single sensor module unit 1031, which includes eight different sensors that are labeled 1-8.

Again, a shared infrastructure definition represented by filter 1041 can be remotely configured using a configuration station. This shared infrastructure definition can be designed to effect the following example forwarding of sensor information: (1) the sensor channel of data from sensor 1 in sensor module unit 1031 attached to wireless node 1030-N is routed to Destination Z-1, (2) the sensor channel of data from sensor 5 in sensor module unit 1031 attached to wireless node 1030-N is routed to Destination Z-2, and the sensor channel of data from sensors 7 and 8 in sensor module unit 1031 attached to wireless node 1030-N are both routed to Destination Z-3.

As these examples illustrate, the remote configuration of a shared infrastructure definition enables customized routing of sensor channels of data on a per sensor basis. This level of granularity enables a high degree of customization in the routing of sensor information to particular interested parties. This selective distribution of sensor information reflects the divergent interests and needs regarding parties responsible for tracking the various characteristics of a monitored location. The remote configuration process enables dynamic adjustment of the forwarding of sensor information as responsibilities at the monitored location transition between different parties.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A method, comprising:
    receiving, by a host system from a configuration station via an electronic network, a first selection of one or more sensors for association with a first transmission destination, and a second selection of one or more sensors for association with a second transmission destination, the one or more sensors of the first selection and the one or more sensors of the second selection installed at a monitored location;
    storing, by the host system, a first association between the first selection of one or more sensors and the first transmission destination, and a second association between the second selection of one or more sensors and the second transmission destination; and
    based on the first association and the second association, transmitting, by the host system, first sensor information generated by measurements from the one or more sensors of the first selection to the first transmission destination and transmitting, by the host system, second sensor information generated by measurements from the one or more sensors of the second selection to the second transmission destination.

2. The method of claim 1, wherein the one or more sensors of the first selection and the one or more sensors of the second selection are supported by a single wireless network.

3. The method of claim 1, wherein the one or more sensors of the first selection and the one or more sensors of the second selection are supported by a gateway device at the monitored location.

4. The method of claim 1, wherein the one or more sensors of the first selection includes a first plurality of sensors supported by a corresponding first plurality of nodes at the monitored location.

5. The method of claim 1, wherein the one or more sensors of the first selection and the one or more sensors of the second selection both include the same sensor at the monitored location.

6. The method of claim 1, wherein the first selection of one or more sensors and the second selection of one or more sensors are mutually exclusive.

7. The method of claim 1, wherein the one or more sensors of the first selection includes sensors of a first type and the one or more sensors of the second selection includes sensors of a second type.

8. The method of claim 1, wherein the one or more sensors of the first selection is installed in a first physical part of the monitored location and the one or more sensors of the second selection is installed in a second physical part of the monitored location, the first physical part different from the second physical part.

9. The method of claim 1, wherein the first selection of one or more sensors is associated with a first logical part of the monitored location and the second selection of one or more sensors is associated with a second logical part of the monitored location, the first logical part different from the second logical part.

10. The method of claim 1, wherein the first transmission destination and the second transmission destination are different websites.

11. The method of claim 1, wherein the monitored location is a building.

12. The method of claim 1, wherein the monitored location is a movable asset.

13. A method, comprising:
    displaying, by a configuration device, a first plurality of user interface elements associated with a first plurality of sensors at a monitored location;
    displaying, by the configuration device, a second plurality of user interface elements associated with a second plurality of sensors installed at the monitored location;
    receiving, by the configuration device, a first selection of one or more of the first plurality of sensors based on interaction by a user with the first plurality of user interface elements for association with a first transmission destination;

receiving, by the configuration device, a second selection of one or more of the second plurality of sensors based on interaction by the user with the second plurality of user interface elements for association with a second transmission destination; and transmitting, by the configuration device to a host system, first configuration information based on the first selection, and second configuration information based on the second selection, the first configuration information and the second configuration information enabling the host system to determine a transmission destination for sensor information received from sensors at the monitored location.

14. The method of claim 13, wherein the one or more of the first plurality of sensors of the first selection and the one or more of the second plurality sensors of the second selection are supported by a single wireless network.

15. The method of claim 13, wherein the one or more of the first plurality of sensors of the first selection and the one or more of the second plurality sensors of the second selection are supported by a gateway device at the monitored location.

16. The method of claim 13, wherein the monitored location is a movable asset.

17. A non-transitory computer-readable medium having a sensor data distribution tool stored thereon for use by one or more servers, the sensor data distribution tool including:

a first section that when executed, causes the sensor data distribution tool to receive from a configuration station via an electronic network, a first selection of one or more sensors for association with a first transmission destination, and a second selection of one or more sensors for association with a second transmission destination, the one or more sensors of the first selection and the one or more sensors of the second selection installed at a monitored location;

a second section that when executed, causes the sensor data distribution tool to store a first association between the first selection of one or more sensors and the first transmission destination, and a second association between the second selection of one or more sensors and the second transmission destination; and a third section that when executed, causes the sensor data distribution tool to transmit, based on the first association, first sensor information generated by measurements from the one or more sensors of the first selection to the first transmission destination and to transmit, based on the second association, second sensor information generated by measurements from the one or more sensors of the second selection to the second transmission destination.

18. The non-transitory computer-readable medium of claim 17, wherein the one or more sensors of the first selection and the one or more sensors of the second selection are supported by a single wireless network.

19. The non-transitory computer-readable medium of claim 17, wherein the one or more sensors of the first selection and the one or more sensors of the second selection are supported by a gateway device at the monitored location.

20. The non-transitory computer-readable medium of claim 17, wherein the monitored location is a movable asset.

* * * * *